Patented July 10, 1951

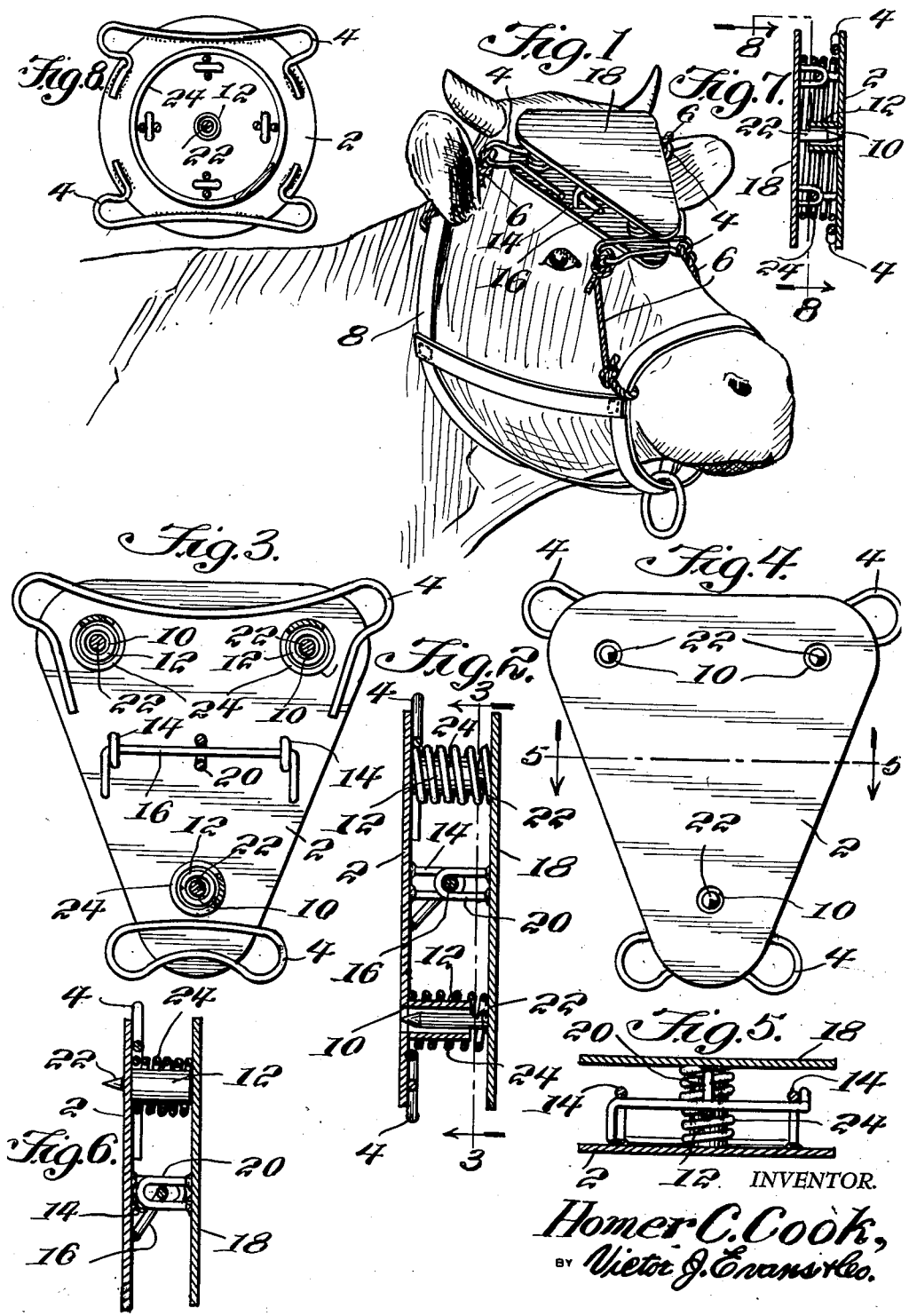

2,559,598

UNITED STATES PATENT OFFICE 2,559,598

HALTER WEAPON FOR CATTLE

Homer C. Cook, Spokane, Mo.

Application June 22, 1948, Serial No. 34,429

1 Claim. (Cl. 119—108)

My present invention relates to an improved halter weapon for cattle and more particularly to a device which when secured to the halter of a bull or cow or steer, will discourage the animal from butting other animals, or any inanimate object by inflicting pain in a minor degree.

The device of my invention consists generally in a pair of spring separated plates to be secured on the forehead of the animal, the plates having telescoping tubes and sharpened pins so that pressure upon the outer plate will extrude the pins through the tubes to press into the forehead of the animal to discourage the butting habit.

In the accompanying drawings I have illustrated one complete example of the physical embodiment of my invention according to the best mode I have thus far devised but it will be understood that various changes and alterations may be made in the exemplified structure within the scope of the appended claim.

In the drawings:

Figure 1 is a perspective view of the device of my invention shown secured upon the forehead of an animal and attached to a halter.

Figure 2 is a longitudinal vertical sectional view of the device in inoperative position.

Figure 3 is a sectional view at line 3—3 of Figure 2.

Figure 4 is a top plan view of the device of my invention.

Figure 5 is a sectional view at line 5—5 of Figure 4.

Figure 6 is a partial sectional view similar to that of Figure 2 showing the pins extended as when prodding the animal.

Figure 7 is a vertical sectional view of a modified form of the device of my invention.

Figure 8 is a sectional view at line 8—8 of Figure 7.

Referring now to the drawings wherein I have illustrated the present preferred embodiment of my invention, I have shown the device as comprising an inner plate 2 of triangular shape although it will be understood that such shape is not critical and having wire loops 4 providing means for attaching a rope 6 which is secured to the usual halter 8.

This plate 2 is formed with spaced openings 10 having disposed thereabout the tubes 12 and upon the outer face of this plate I secure the brackets 14 through which the arm of yoke 16 extends.

Co-acting with this plate I used a second outer plate 18 having a bracket 20 through the arm of the yoke also extends to limit the separating movement of the plates, and the pins 22 on the plate 18 are aligned with and extend into the tubes. Coiled springs 24 are interposed between the plates about the tubes and pins to resiliently separate the plates.

The pins are, of course, of sufficient length to extend through the openings of the plate 2 when the springs are compressed as when the animal butts another animal, and the points of the pins will prick or prod the forehead of the animal discouraging the practice. The animal will suffer no harm and extreme pain but the continued pricking of the pins with every attempt at butting will soon teach the animal not to butt.

The device of my invention is obviously inexpensive to manufacture and is easy to install, and will have no effect upon the animal so long as it does not butt.

In the modified form of Figures 7 and 8 I have shown the plates as being circular instead of triangular and the single central pin and tube and surrounded by a single large coiled spring. Otherwise the parts are the same as those described in Figures 1 through 6.

Having thus fully described my invention what I claim as new and desire to secure by Letters Patent is:

In a device of the class described, a first plate, a plurality of wire loops secured to said first plate, means secured to said loops for connecting said plate to a halter so that said plate rests on the forehead of an animal, there being a plurality of spaced openings in said first plate, a plurality of tubes secured to said first plate and registering with the openings therein, a second plate arranged in spaced parallel relation with respect to said first plate and mounted for movement towards and away from the latter, a plurality of pins carried by said second plate and projecting through said tubes, said pins being mounted for movement through said openings to prick the forehead of the animal when the second plate is moved toward the first plate, a coil spring circumposed on each of said tubes for normally urging said pins out of engagement with the animal, and means for limiting movement of said second plate away from said first plate, said means comprising alternately spaced brackets mounted on the inner surfaces of the plates and extending toward each other and a yoke passing through said brackets and having the ends thereof engaging the rear surface of said first plate.

HOMER C. COOK.

REFERENCES CITED

The following references are of record in the file of this patent:

UNITED STATES PATENTS

| Number | Name | Date |
|---|---|---|
| 716,733 | Miller | Dec. 23, 1902 |
| 1,214,927 | Knittel | Feb. 6, 1917 |
| 1,486,419 | Crawford | Mar. 11, 1924 |
| 2,212,160 | Kelly | Aug. 20, 1940 |